June 17, 1941.  E. W. BRANDT  2,246,429
PROJECTILE
Filed March 24, 1937  5 Sheets-Sheet 1

Inventor:
Edgar W. Brandt
By: Mason & Porter
Attorneys

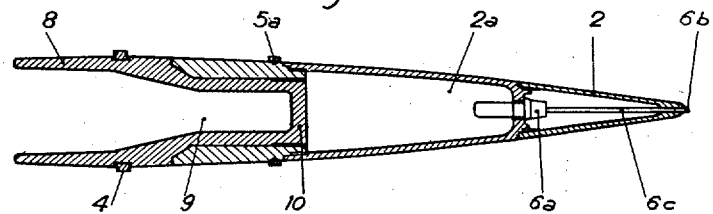
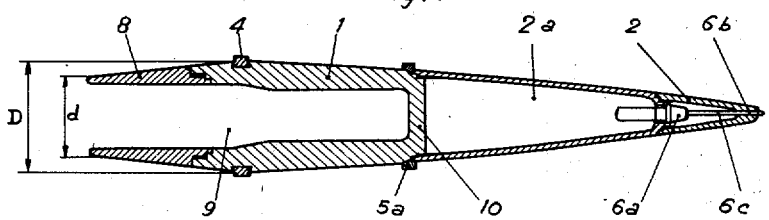
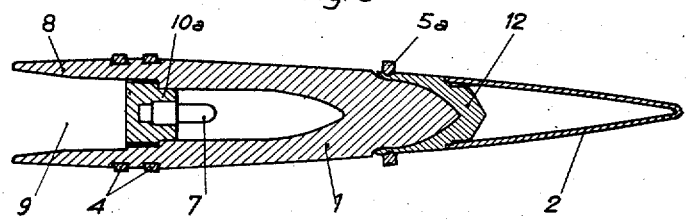
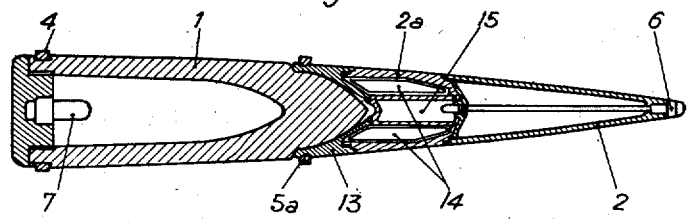
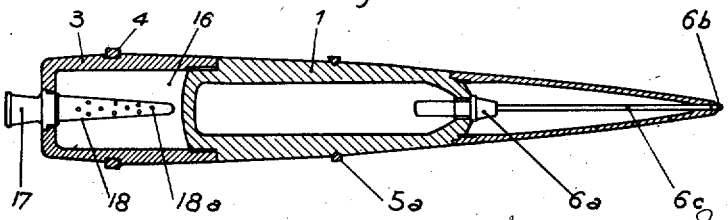

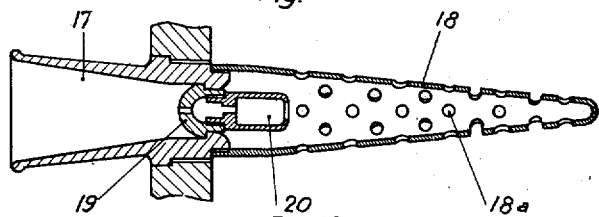
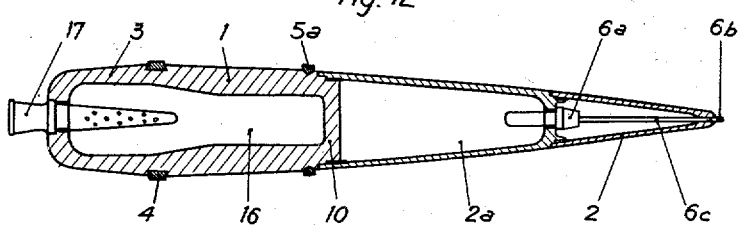
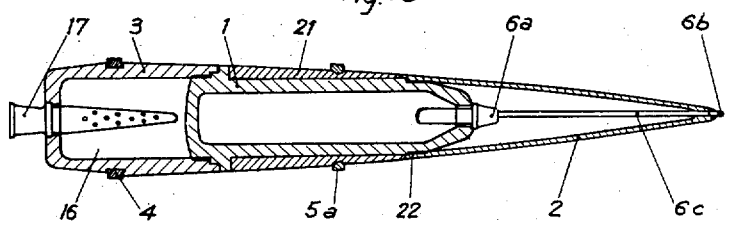
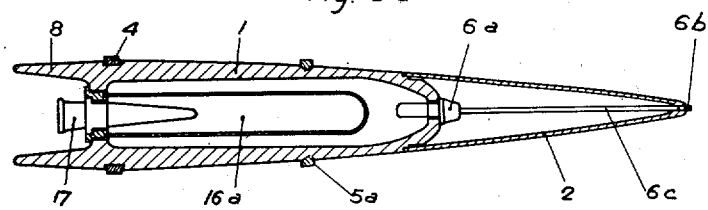
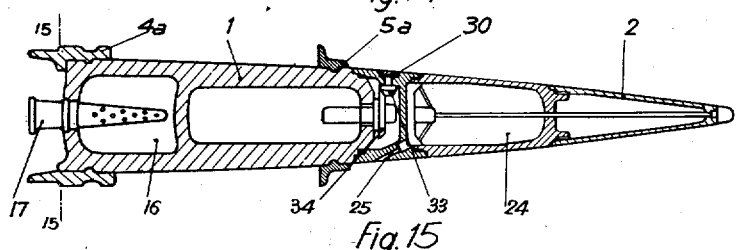
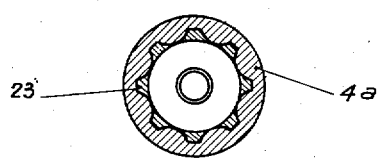

June 17, 1941.　　　E. W. BRANDT　　　2,246,429
PROJECTILE
Filed March 24, 1937　　　5 Sheets-Sheet 4
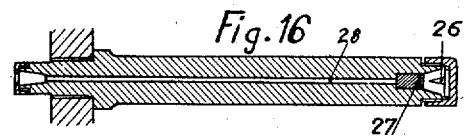
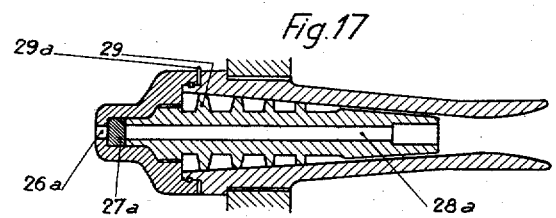
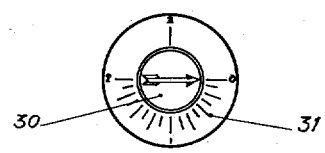
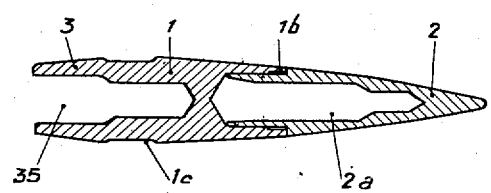
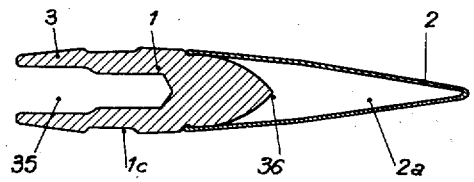
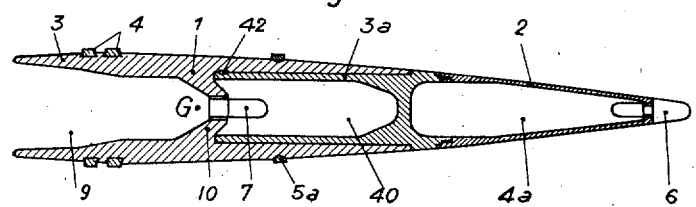

June 17, 1941.　　　E. W. BRANDT　　　2,246,429
PROJECTILE
Filed March 24, 1937　　　5 Sheets-Sheet 5

Inventor:
Edgar W. Brandt
By: Mason & Porter
Attorneys

Patented June 17, 1941

2,246,429

UNITED STATES PATENT OFFICE 2,246,429

PROJECTILE

Edgar William Brandt, Paris, France, assignor to Sageb, Société Anonyme de Gestion et d'Exploitation de Brevets, Fribourg, Switzerland, a corporation of Switzerland Application March 24, 1937, Serial No. 132,845
In France March 30, 1936

5 Claims. (Cl. 102—26)

This invention relates to projectiles animated with a gyratory motion about their longitudinal axes, and more particularly to shells provided with an internal cavity for containing an explosive or other charge. Such a projectile enables the ballistic coefficient, and consequently the range and precision of said projectiles, to be improved.

One known method for improving the ballistic properties of the shell consists in highly elongating the tapered end, thereby facilitating its passage through the air. Up to the present however, a limit has been imposed on this method by the practical impossibility of stabilising projectiles that are very long in relation to their calibre.

An object of the present invention is to afford a judicious distribution of the masses in the body of the projectile so as to ensure perfect stability of the projectile, even if it be very long in relation to its calibre. To this end, the invention contemplates reducing the weight at the two ends of the casing of the shell so that the mass will be concentrated in the intermediate portion.

The effect of this distribution of the masses is to shift the centre of gravity of the shell toward the front and to endow it with a maximum moment of inertia in relation to its longitudinal axis, coupled with a minimum moment of inertia in relation to a transverse axis passing through the centre of gravity. For a given rotational speed all these conditions ensure the attainment of an optimum coefficient of stability and enable an exceptional stability to be imparted to shells with a length corresponding to six calibres, or more, without altering the usual pitch of the rifling of the guns.

The concentration of the mass in the intermediate portion of the body can be effected, as for example in the case of an explosive projectile, by making this portion of the casing thicker, or of denser material than the extremities. The maximum effect will, of course, be obtained by combining these two methods.

In the case of a composite projectile, the nature and dimensions of the component parts, that is, base and tapered member, are selected in such a manner that they will be sufficiently strong to withstand the propulsive stresses while remaining as light as possible.

Thus, for example, the base may consist of a high-tensile steel; the intermediate portion of the shell of mild, or semi-hard steel; and the tapered front of semi-hard steel, Duralumin, or other light alloy.

A second embodiment of the invention is concerned with extending the ogive as far as the rear end of the projectile, so that it continues not only over the light forward portion, but also over the entire length of the heavy intermediate portion and even, if desired, over the whole, or part, of the light rearward portion of the projectile. In such case, the forward portion of the projectile is guided inside the gun, preferably by means of a detachable band.

The improvement in shape obtained by this embodiment is particularly important. On the other hand, and pari passu, with the increased range resulting from this improved shape, it enables the weight of the projectile to be reduced, thereby imparting, for a given propulsive charge, higher initial velocities without subjecting the materials employed to stresses exceeding permissible limits. The resulting gain in velocity through the improved aerodynamic shape of the projectile more than outweighs the reduction of range which, in the case of an ordinary projectile, would necessarily result from the reduction of its weight.

Another special feature of the invention resides in the fact that, at the back of the base member, the projectile is extended in the form of a sleeve surrounding a cavity adapted to receive a portion of the propulsive charge of the cartridge, the side walls surrounding said cavity being thinned down in the rearward direction.

This arrangement, too, enables the range of a shell of given calibre, to be increased by means of an increase in the charge of propellant.

According to one structural embodiment of the invention, the concentration of the mass in the vicinity of the centre of gravity is obtained by surrounding the casing of the projectile which, in this region, has a smaller outside diameter than the adjacent rearward portion, with a sleeve of heavier material than the casing, the exterior profile of said sleeve having a tapered ogival curvature merging into a false ogive forming the forward part of the projectile.

In a modified embodiment, the projectile is extended rearwardly by a separate compartment to accommodate a rocket charge provided with suitable ignition means and adapted to discharge through a nozzle, during flight, with a view to increasing the velocity of the projectile by the effect of reaction.

The invention also extends to a modified embodiment, in which the forward portion of the projectile carries a device which marks the point at which it drops, especially into water.

It also provides for a special arrangement of the light forward portion of the projectile, so as to enable it to accommodate a rocket charge functioning by reaction, and adapted to act independently of or in conjunction with a similar charge, which may be located in a rearward compartment, with a view to increasing the velocity of travel of the projectile at the desired moment. These rocket charges may, if desired, discharge into nozzles set obliquely in relation to the longitudinal axis of the projectile, for the purpose of imparting to the latter a torque which either accelerates or retards its angular velocity in order to maintain a suitable ratio between the latter and the velocity of translation.

The invention also relates to a special arrangement of the primer of the projectile, and the device controlling same.

It also extends to the special arrangement of a bullet for small arms, and to a bullet of novel profile, and also to the provision of a shell intended to serve as a gun for a secondary projectile which it fires during its trajectory with a view to increasing the range.

In order to more clearly understand the invention, reference is made to the accompanying drawings, which illustrate diagrammatically and by way of example, various embodiments thereof, and in which:

Figs. 5–10 are longitudinal sections of other embodiments;

Fig. 11 shows a sectional detail of Fig. 10 on a larger scale;

Figs. 12–14 are longitudinal sections of other embodiments;

Fig. 15 is a cross section along the line 15—15 of Fig. 14;

Figs. 16–18 show sectional details of Fig. 14 on a larger scale;

Figs. 19–22 are longitudinal sections of further embodiments;

Figure 1:
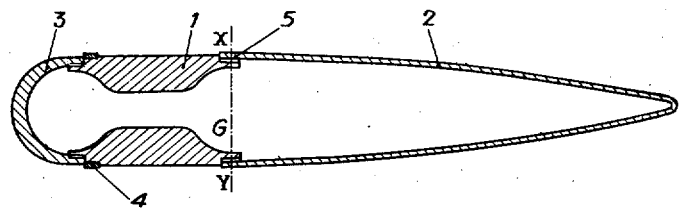
Fig. 1 shows a longitudinal sectional view representing the theoretical shape of a projectile embodying the principle of distribution of masses according to the invention.

According to the theoretical example shown in Fig. 1 the casing of the projectile according to the invention is constituted by a heavy intermediate portion 1, with thick walls to which are attached on the one hand, an ogive 2, and on the other hand, a base 3, both as light and thin as is consistent with the stresses that they are required to resist.

The plane of junction $x$—$y$ between the ogive 2 and body 1, is preferably located near the centre of gravity G of the loaded projectile.

The total length of the projectile is about six calibres, or more.

The heavy portion 1 is provided—preferably near its extremities—with driving bands 4 and guiding bands 5.

By reason of its length and the thinness of its walls, such a projectile is capable of containing a large charge of explosive in relation to its weight. On the other hand, experience shows that the instantaneous character of the deflagration of modern explosives is such that excellent fragmentation of the heavy portion is obtained, despite the weakening of the ogive and the base. However, as experience has shown, the substantial advantage of distributing the masses in the manner shown in Fig. 1 consists in the stability it imparts to the projectile, notwithstanding the great length of the latter.

This is understandable because the centre of gravity, being near to the point of application of the resultant of the thrust of the air, and said thrust being applied with a small lever arm, has a smaller tendency to upset the projectile. This advantage is obtained without locating the heavy mass in the ogive, that is in a portion of small diameter, which would have the disadvantage of reducing the moment of inertia about the longitudinal axis of the projectile, which moment of inertia should, as is known, be as large as possible. On the other hand, the lightness of the extremities of the shell reduces to a minimum the moment of inertia of "pitching" (that is to say, the moment of inertia about a transverse axis passing through the center of gravity). This also serves to increase stability.

Figure 2:
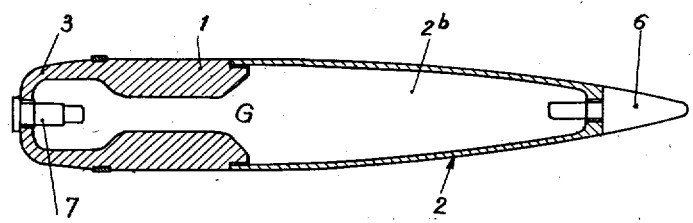
Fig. 2 is an axial section of one embodiment of the invention.

Fig. 2 shows a typical practical embodiment of the projectile according to Fig. 1. The walls of the one-piece base are thick in the forward portion 1, near the centre of gravity G, and thin in the rearward portion 3.

The slender and light tapered ogive 2 is joined to the body 1, 3 by suitable means. The ogive is preferably composed of a light alloy, such as Duralumin or also of steel. The explosive or other charge completely fills the interior cavity $2b$ of the projectile, and may be primed by means of a fuse 6 in the nose, or by a fuse 7 in the base, or even by the two conjointly as shown in Fig. 2.

Figure 3:
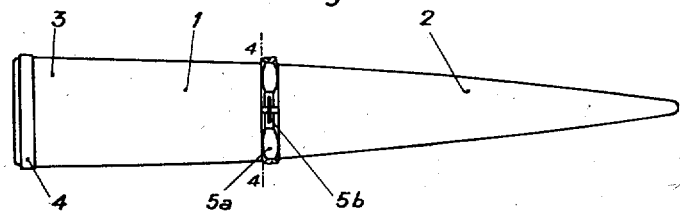
Fig. 3 is an elevation of a modification showing the extension of the ogive as far as the rear end, and the guiding means consisting of a detachable band suitably located on the ogival body of the projectile.
Figure 4:
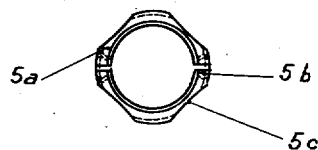
Fig. 4 is a cross section along 4—4 of Fig. 3.

According to the example shown in Fig. 3, the ogive extends not only over the light forward portion 2 of the projectile, but also over the entire length of the heavy intermediate portion 1, and even over the light rearward portion 3 which carries the driving band 4. When said band is set back on the rear extremity of the shell, as in Fig. 3, the external profile is ogival from one end to the other. Forward guidance is preferably obtained by means of an ejectable band $5a$ (Figs. 3 and 4) forming a veritable split ring which is preferably composed of several members interconnected by means of a ligature $5b$, or equivalent device. The several interconnected members composing the ejectable guiding band are constructed and arranged so as to be dislodged from the projectile through the vis viva imparted to these very guiding members by centrifugal force when the projectile issues from the rifled arm.

Said band may be recessed, as at $5c$, to allow passage to the gases which penetrate, especially in arms that have become worn, between the driving bands 4 and the rifling grooves. This arrangement prevents the gases from forcing the band $5a$ forwardly.

The projectile could also be guided by the aid of projections uniformly distributed round the periphery of the ogive. Said projections—detachable if desired—could be streamlined in order to facilitate progress through the air.

Figure 5:
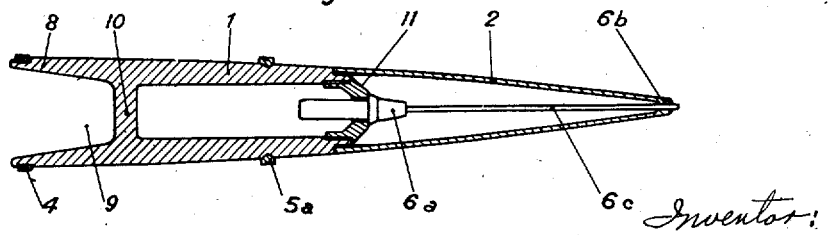

In the example shown in Fig. 5, the body of the projectile is rearwardly extended by a sleeve 8, the space 9 between said sleeve and the base 10 being adapted to accommodate a filling of propulsive charge. The thickness of the sleeve 8 preferably diminishes towards the rear, in order to lighten the extremity. Said sleeve is provided with one or more driving bands 4. The outer surface of the casing 1, 8 is ogival in shape, nearly as far as the driving band 4, and merges forwardly into that of a false ogive 2.

At the forward end, the casing is closed by an attached member 11, which may be of lighter material than the body 1, 8 and may carry a fuse 6a adapted to be actuated by a striker 6b to which it is connected by a firing tube 6c. It is evident that the shell could also be primed by means of a time fuse, or a combined fuse. Instead of being in two pieces, the body 1, 8 may also be a monobloc.

The sleeve 8 may be of lighter material than the body 1, and may be suitably attached thereto.

By confining the mass exclusively to the perimeter, the rearward conformation increases the coefficient of stability, while enabling the cavity 9 to receive an additional propulsive charge which increases the initial velocity.

The position chosen for the fuse 6a in Fig. 5, assists in concentrating the mass in the vicinity of the centre of gravity.

The forward guidance of the projectile is obtained by means of the detachable band 5a.

Fig. 6 shows a modification of the projectile of Fig. 5, wherein a portion of the propulsive charge extends deeper into the projectile and nearly half way along the latter. The offensive charge is then lodged in a forward compartment 2a, located in the more attenuated portion of the ogive. When this compartment is intended, for example, to contain a bursting charge, it may be sheathed with a comparatively thin sheet metal merging into the false ogive 2 of light alloy.

Owing to the considerably increased accommodation it affords for the propulsive charge for a given calibre, this arrangement, in combination with the accompanying reduction in weight, enables even longer ranges to be obtained than in the case of the embodiment of Fig. 5.

In the example shown in Fig. 7, the sleeve 8, preferably of lighter material than the body 1, tapers towards the rear, as shown, with a view to obtaining a bi-ogival profile of the projectile as a whole.

The posterior opening in the sleeve may, advantageously, have a diameter $d$ which is considerably smaller than the calibre $D$, with a view to minimising the deterimental negative pressure prevailing at the rear of the shell during its trajectory, the result being a further increase in range. In this case, the reduced diameter of the rearward portion further aids in obtaining the desired reduction of weight in this zone.

Fig. 8 shows an embodiment similar to that of Fig. 5, but applied to an armour-piercing, explosive projectile. The arc of the false ogive 2 is extended over the outer surface of a hood 12 (mounted on the nose of the casing) and continued along the perimeter of the body 1, as far as the driving bands 4.

The base consists of an attached member 10a, carrying a primer 7, and composed (if desired) of a material that is lighter than that of the body 1, with a view to obtaining a judicious distribution of the masses.

Forward guidance is obtained by means of the ejectable band 5a.

The mass of the sleeve 8 supplements that of the casing 1, to increase the perforating power, and this result is also accomplished by the tapering of the forward portion of the casing 1.

Fig. 9 shows another modification of the armour-piercing, explosive projectile, provided with a false ogive 2 merging into the ogival exterior curvature of the member 1, which is continued as far as the band 4. The forward band 5a, which is detachable on issuing from the gun, ensures the guidance of the shell. The false ogive is constructed of several members, its frontal portion 2 being preferably composed of magnesium, or similar light material with a view to marking its point of impact on a resistant target. The rear portion 2a is mounted on the body 1, either directly or by means of an interposed annular member 13, and comprises an annular compartment 14 accommodating a charge intended to mark the point of impact on a target which is not resistant. Said charge may be composed, for example, of sodium or potassium, preferably in a finely divided condition, when it is desired to indicate the point at which the projectile falls into water. A central cavity 15 in the member 2a contains an explosive charge capable of being ignited by a primer 6 and adapted to expel the photogenic charge on impact. The forward portion of the false ogive, carrying the primer 6, may be screwed on to the member 2a, or attached thereto in any other way. The members 2 and 2a preferably consist of portions of corresponding shape, fitting one into another in order to provide the desired rigidity.

The projectile is primed by means of a primer 7 in the base.

Fig. 10 shows another modification of a projectile comprising a casing which contains the offensive charge. To the rear end of this casing is attached a base 3, which should be as light as possible, forming a separate compartment 16 which receives a rocket charge of pyrotechnic or other nature, adapted to escape towards the rear, through a nozzle 17, so as to drive the shell forward by reaction.

The interior portion of the nozzle is preferably in the form of a grating 18, with perforations 18a of such dimensions as to prevent the passage of unburnt particles of powder, and at the same time prevent choking the nozzle, while regulating the propulsive effect.

The nozzle is preferably provided with an external choke 19 (Fig. 11), so designed as to facilitate the passage from the propulsive charge of the cartridge of the amount of gas needed for the proper ignition of the reaction charge, but to prevent the full pressure obtaining in the barrel of the gun from being transmitted to the compartment 16. The choke may also contain a delay-action device 20, intended to postpone the ignition of the priming composition until the moment the projectile has reached, during its flight, a point deemed suitable for bringing into operation the reaction effect intended for increasing the velocity and lengthening the range.

In the modification shown in Fig. 12, the compartment 16 is deeper and extends nearly half way along the entire projectile. In such case, the offensive charge is located in a forward compartment of a tapered portion of the ogive, as in the case of Fig. 6.

Fig. 13 represents a construction similar to that of Fig. 8, but differing therefrom in that the body, or casing, of the shell comprises a midway portion I of smaller outside diameter than the adjoining rearward portion 3, and this midway portion I is surrounded by a sleeve 21 of heavier material than the casing. The external surface of said sleeve is ogival, into which merges the false ogive 2 mounted on the casing (or sleeve) at 22. Said false ogive is preferably constructed of light material, such as a magnesium base alloy.

The embodiment of Fig. 13 enables the mass of the projectile to be still further concentrated on its periphery in the zone of the centre of gravity, thereby increasing the coefficient of stability.

The sleeve of heavy metal also possesses the advantage that the fragments produced by bursting are projected to a much greater distance than those of ordinary steel.

The forward guidance of the shell in the gun is obtained by means of a detachable band 5a.

On the other hand, the accentuated taper of the profile facilitates travel through the air and—conditions being otherwise equal—ensures a greater residual velocity for a given range, and a longer maximum range.

Fig. 13a is a modification of the embodiment shown in Fig. 13, from which it differs in that the reaction charge is located in a compartment 16a situated in the interior of the compartment which receives the offensive charge.

The compartment 16a may, advantageously, be bounded by a thin insulating sheath around which the offensive charge itself forms a resistant casing. This form also improves the distribution of the masses.

In particular, this arrangement offers the advantage of ensuring the complete fragmentation of the body I, in the case of an explosive projectile, which latter may then be terminated, in the rear, by a sleeve 8, as in the case of Fig. 5.

Fig. 14 shows another embodiment differing from the foregoing by the following features:

The projectile is of the sub-calibre type and is centred in the gun by the aid of a thick driving band 4a, mounted near its rear end. In order to ensure, in a positive manner, the rotation of the projectile during flight, the latter may be advantageously provided—preferably on the rear face of the base—with a series of indentations 23 engaged by corresponding projections on the inner surface of the detachable band 4a (Fig. 15). Forward guidance is provided by the detachable band 5a.

With a view to increasing the range, the forward zone of the projectile is provided with a compartment 24 accommodating a rocket charge adapted to escape rearwardly through nozzles 25. Said nozzles are preferably arranged to point obliquely in relation to the axis of the projectile, with a view to imparting to the shell an axial torque which will tend to increase—or, on the contrary, reduce—the gyratory velocity due to the action of the rifling grooves in accordance with the orientation of the nozzles. Such oblique nozzles may also be provided in the compartment 16.

The functioning of the reaction charge can be controlled by a device of the kind shown in Fig. 16. A primer 27 is arranged in such a way as to encounter the striker 26, by inertia, when the projectile is discharged. The primer 27 ignites a delay-action composition 28 which deflagrates the priming charge at the end of a predetermined time after leaving the gun.

Another delay-action ignition device may be such as that shown in Fig. 17. The gases from the propulsive charge penetrate, by way of the hole 26a, in sufficient amount to ignite the pyrotechnic time-fuse 27a. When this composition is burnt it ignites a charge 28a—of black powder for example—the explosition of which is intended, on the one hand, to ignite the rocket charge and, on the other, to expel towards the rear the whole of the device located in the nozzle, and free the latter. The indentations 29 are to prevent the gases of the propulsive charge in the gun from reaching the propulsive reaction charge by way of the joints 29a of the device.

The reaction devices of the forward and rear compartments 24 and 16 may be adjusted so as to function simultaneously or successively according to requirement.

The ignition of the offensive charge is performed by a percussion fuse, time-fuse or mixed fuse. The device for timing the fuse when such is provided, may, with advantage, be accurately set by an external pointer 30 (Figs. 14 and 18), adapted to be turned in front of a scale 31, and controlling the rotation of the fuse plates 34 by means of pinion gear 33. This arrangement also enables plates of large diameter to be employed, thereby facilitating construction and the attainment of a very wide timing range.

Fig. 19 shows another form of construction applied to a projectile of small calibre, such as those for automatic weapons.

The false ogive 2, of light material, fits into the socket 1b formed by the forward end of the body I, of heavier material, and surrounds a cavity 2a, which may be left empty or be charged with smoke-producing, incendiary, poisonous or the like material. Here again, the profile of the ogive 2 is continued over the heavy intermediate portion I of the body, which may be provided with a throat in the zone of engagement with the rifling grooves. A cavity 35 of diminishing diameter from front to rear assures, in combination with the tapering of the body in the rear zone 3, a judicious distribution of the masses in the projectile, while considerably reducing the weight of the latter.

The cavity 35 may be left empty or be recharged with a "tracer" composition, or it may serve to accommodate a portion of the propulsive charge, or a rocket charge, with a view to producing a reaction effect, as in the case of Figs. 8, 10 and 12.

Fig. 20 shows an embodiment of the invention as applied to a piercing bullet. Towards the rear, the bullet is similar in shape to that of Fig. 19, and comprises in front, a solid piercing nose 36 capped by a false ogive 2. The nose 36 is hardened by suitable treatment.

Fig. 21 shows the application of the improvements according to the invention to a mixed projectile comprising a rear portion I, 3, which serves as a gun for the discharge at a predetermined point in the trajectory of the forward portion 2, 3a, which constitutes a complete shell in itself. Such mixed projectiles, or combinations of gun and projectile, are known in principle, but the present invention enables them to be produced in a particularly effective manner.

The assembly formed by the two components exhibits the main characteristics, already defined, both as regards the distribution of the masses and the prolongation of the ogive.

Figure 22:
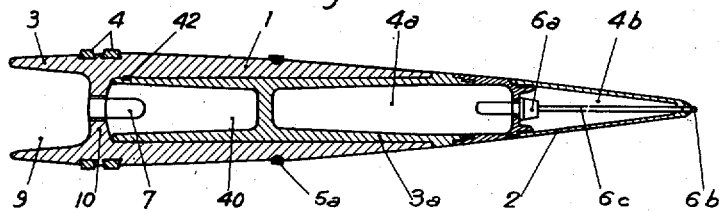

In Fig. 21, the portion forming the gun comprises the body 1, which is closed in the rear, by the base 10 and is prolonged by the sleeve 3 carrying the driving bands 4. The space 9 is intended to receive a fraction of the propulsive charge. Seated in the body 1 is the secondary projectile which comprises a body 2 accommodating the offensive charge and terminating at the rear in a sleeve 3a containing the secondary propulsive charge 40, the ignition of which is controlled by a time fuse 7, of any kind, mounted in the base 10. The offensive charge may either fill the forward cavity 4a of the shell completely, or only partially, in which case the remaining portion 4b (Fig. 22) may be left empty or contain a photogenic charge, or the like.

The thickness of the tube 1 diminishes from front to rear, thus facilitating stability, whilst effecting the distribution of the masses in accordance with the invention and, at the same time, complying with the general rules for the construction of guns with walls which diminish in thickness towards the muzzle in order to take into consideration the expansion of the gases in proportion as the projectile advances. The ogive 2 and tube 1 preferably fit tangentially.

5a denotes an ejectable guiding band.

Figure 23:
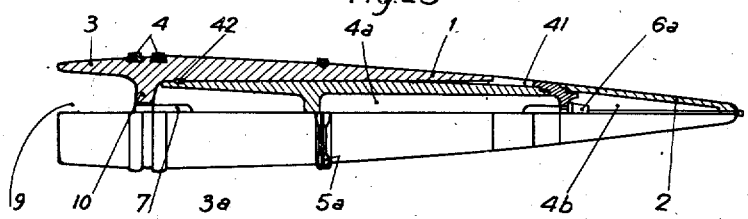
Fig. 23 is a sectional elevation of another modification.
Figure 24:
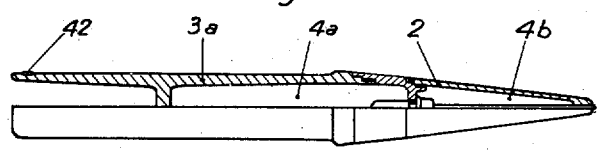
Fig. 24 is a sectional elevation of a detail of Fig. 23.

In the example shown in Fig. 23, the junction is effected by the agency of a ring 41 engaging with the tube 1 and ogive 2, and preferably composed of several members, held together by a ligature which breaks away on issuing from the tube, so that the ring components are scattered by centrifugal force.

The tube 1 is preferably provided with interior grooves coacting with nipples 42, or driving bands for the secondary projectile to which they impart a sufficient gyratory velocity on the new trajectory which it should describe after being discharged from the tube 1.

In these various constructional embodiments the mixed projectile and the secondary shell are both endowed with excellent stability. The length of the tube 1 permits normal expansion and effective action of the propulsive charge 40.

Figure 25:
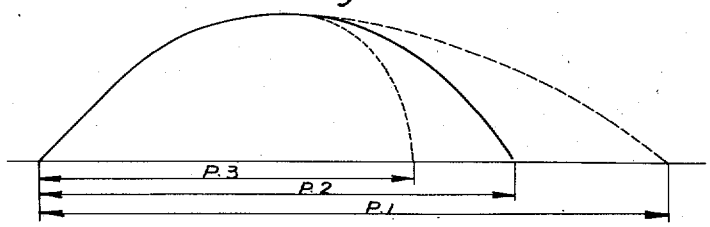
Fig. 25 is an explanatory diagram.

As a result, the range P.1 (Fig. 25) attained by the secondary projectile will greatly exceed that P.2, registered with a monobloc projectile. In Fig. 25, P.3 indicates the range of the body 1, 3.

The fuse 7 for igniting the secondary propulsive charge is preferably adjusted so as to effect the discharge of the secondary projectile in the vicinity of the maximum altitude of the trajectory of the primary projectile, in order to derive maximum benefit from the lower air resistance at high altitudes.

Figure 26:
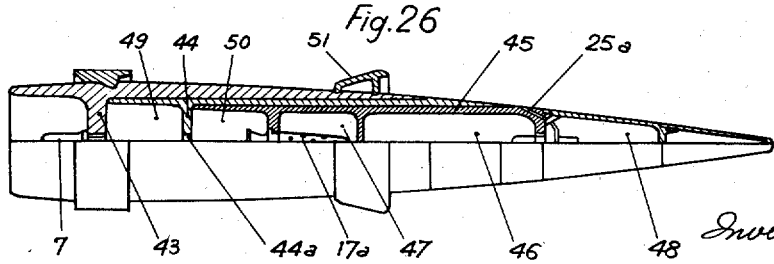
Fig. 26 is a sectional elevation of another embodiment.

Fig. 26 represents another possible combination of the foregoing improvements. In its interior, the projectile 43 carries another projectile 44 which, in turn, carries a third projectile 45, the latter containing the offensive charge 46 and also two charges of propulsive powder 47 and 48, the products of combustion from 47 escaping through the rear nozzle 17a, while those of the charge 48 issue through the lateral nozzles 25a.

The complete unit being fired from a gun by an ordinary, or reinforced charge of powder, does not undergo disjunction until it reaches a point which is considered as most favourable in the trajectory and as set by the fuse 7. At that moment, the two propulsive charges 49 and 50—the former being located between the first and second projectiles, and the other between the second and third—should be ignited simultaneously in order to enable the projectile 45 to benefit by the reaction on the entire mass of the two projectiles 44 and 43, thus providing an arrangement which is more advantageous than if the projectile 45 were bearing solely against the mass of the projectile 44. One or more communication holes 44a are provided in the base of the projectile 44, to ensure the simultaneous ignition of the two propulsive charges. The guide band may have the form indicated by 51.

In the various foregoing embodiments, it has been assumed that the ogive extending over the major portion of the length of the projectile has a uniform arc of curvature, but it should be understood that the ogive may also comprise sections having different arcs of curvature fitting together tangentially.

It may also be pointed out that the special arrangements, such as the employment of a heavy central sleeve 21 (shown by way of example in Fig. 13), the prolongation of the ogive as far as the base (Fig. 3), the provision of a rear cavity 9 (Figs. 5 and 6), the utilisation of reaction charges (Figs. 10, 12, 13, 13a, 14 and 26), or of a photogenic charge (Fig. 9) and sub-calibre projectiles (Fig. 14), may be applied to all the embodiments of the invention. These various combinations, which are obvious to those skilled in the art, have been omitted from the drawings in order to avoid an undue multiplicity of the drawings.

The monobloc units, such as the body 1, 8 of Fig. 5, could obviously be made in two parts, the one portion, 1, of heavy material and the other portion, 8, of lighter material.

The driving bands may vary in number and position according to requirements.

The respective lengths (measured in calibres) of the light terminal members and the heavy intermediate portion of the projectile, may vary to a considerable degree according to the nature of the projectile, as is shown in the several figures of the drawings.

In short, the embodiments described and illustrated have been given solely by way of example, and the details may be modified in various ways without departing from the spirit of the invention.

Having now particularly described and ascertained the nature of my said invention and in what manner the same is to be performed, I declare that what I claim is:

1. A projectile for rifled arms, comprising a body having the greatest part of its longitudinal exterior profile in the form of an ogive decreasing from the portion of maximum diameter of the body to the front end thereof, a driving band located near the rear end of said body, and ejectable guiding means located on the ogival portion of the body and spaced forwardly thereon in advance of the portion of maximum diameter of the body, said ejectable guiding means being made of a plurality of ejectable guiding pieces constructed and arranged to be dislodged from the projectile through the vis viva imparted to those very guiding pieces by the centrifugal force, when the projectile issues from the rifled arm.

2. A full caliber projectile for rifled arms, comprising a body exteriorly shaped to provide a full caliber portion adjacent the rear end of the projectile and exteriorly shaped to provide an ogive from the full caliber portion to the front end thereof, a driving band arranged on the periphery of said body at the full caliber portion, and ejectable guiding means disposed on the ogival portion of the body and spaced and independent of said driving band, said ejectable guiding means being made of a plurality of ejectable guiding pieces formed with longitudinally extending notches to permit the passage of the gases thereby and being constructed and arranged to be dislodged from the projectile through the vis viva imparted to those very ejectable guiding pieces by the centrifugal force, when the projectile issues from the rifled arm.

3. A projectile for rifled arms comprising a body exteriorly shaped to provide a full caliber portion adjacent the rear end of the projectile and exteriorly shaped to provide an ogive from the full caliber portion to the front end thereof, a driving band arranged on the periphery of said body at the full caliber portion and an ejectable guiding band disposed in advance of said driving band on the ogive and consisting of a split ring formed with longitudinally extending recesses allowing gases to pass thereby and connecting means for the split ring constructed and arranged to breakaway exclusively through the vis viva imparted to the split ring by the centrifugal force, when the projectile issues from the rifled arm.

4. A full caliber projectile for rifled arms, comprising a body having a single interior cavity and exteriorly shaped to provide an ogive from the portion of maximum diameter thereof to the front end of the projectile, a driving band arranged on the periphery of said body in the region of the portion of maximum diameter thereof, the walls of said body being of homogeneous metal at least in the middle portion of their length adjacent the center of gravity of the projectile and being shaped to give to the interior cavity a smaller diameter in said middle portion than in the front and rear parts of the body and ejectable guiding means disposed on the ogival portion of said body and spaced and independent of said driving band, said ejectable guiding means being made of a plurality of ejectable guiding pieces formed with longitudinally extending notches to permit the passage of the gases thereby and being constructed and arranged to be dislodged from the projectile through the vis viva imparted to those very guiding pieces by the centrifugal force, when the projectile issues from the rifled arm.

5. A full caliber projectile for rifled arms, comprising a body provided with an interior cavity, an offensive charge in said cavity, a driving band arranged on the periphery of said body close to the rear end thereof, the walls of said body being of homogeneous metal at least in the middle portion of their length adjacent the center of gravity of the projectile and being shaped to give to the interior cavity a smaller diameter in said middle portion than in the front and rear parts of the body, and the exterior profile of said body decreasing continuously from said driving band to the front end of the projectile.

EDGAR WILLIAM BRANDT.